United States Patent Office 3,293,164
Patented Dec. 20, 1966

3,293,164
AZO COMPOUNDS AS PROMOTERS FOR THE SYNTHESIS OF HALOGENATED THIO-ETHERS
Paul F. Warner, Phillips, Tex., assignor to Phillips Petroleum Company, a corporation of Delaware
No Drawing. Filed June 3, 1963, Ser. No. 284,812
9 Claims. (Cl. 204—158)

This invention relates to the preparation of halogenated thioethers. More particularly, it relates to the preparation of halogenated thioethers in the presence of azo compounds.

The preparation of thioethers by reacting mercaptans or halogenated mercaptans with organic compounds containing ethylenic linkages is well known in the art. When this reaction is carried out photochemically in the presence of ultraviolet radiation, the addition of the sulfhydryl group, —SH, to the unsaturated compound occurs in an abnormal manner, that is, contrary to the course suggested by the Markovnikov rule (the sulfhydryl group becomes affixed to the unsaturated carbon atoms holding the most hydrogen atoms) and the hydrogen atom becomes affixed to that unsaturated carbon atom carrying the lesser number of hydrogen atoms. This abnormal conversion reaction is well known in the art and has been used to form thioethers, such as those used in insecticide and repellent compositions, etc. However, the conversion of the unsaturated compound by this reaction is often of a low order, and many unsaturated compounds, such as ethylene, are not readily converted while others require an induction period before any appreciable conversion results. Also, the yields of thioethers when prepared according to this known photochemical process have not been as great as desired.

It is an object of this invention to provide a novel method for the preparation of halogenated thioether compounds.

It is another object of the invention to provide a novel method for the preparation of thioethers by reacting mercaptans or halogenated mercaptans with ethylenically unsaturated compounds in the presence of ultra-violet radiation and a novel reaction promoter.

It is another object of the invention to increase the rate of the reaction of ethylenically unsaturated organic compounds with mercaptans or halogenated mercaptans in the presence of ultra-violet radiation.

Still another object is to increase the yield of thioethers produced in the reaction between ethylenically unsaturated organic compounds and mercaptans or halogenated mercaptans.

These and other objects and advantages will be readily apparent to those skilled in the art from the following disclosure and claims.

These objects are broadly accomplished by contacting an ethylenically unsaturated organic compound with a mercaptan in a reaction zone in the presence of an azo compound, at least one of said reactants being a halogenated compound, and subjecting the reactants to the influence of light rays.

It has now been discovered that the reaction between an unsaturated organic compound and a mercaptan in the presence of ultra-violet light is accelerated in the presence of an azo compound which has an acyclic azo group, —N=N—, bonded to different carbons which are non-aromatic, that is, aliphatic or cycloaliphatic, at least one of which is tertiary and has attached, through carbon, a negative radical which has the three remaining valences of the latter carbon satisfied only by at least one element of atomic number of 7 to 8 (oxygen and/or nitrogen). The negative radical is generally neutral with respect to acidity and includes the nitrile, carbalkoxy, and carbonamide groups. The products obtained have structures which are not predicated by the Markovnikov rule.

The unsaturated organic compounds to which the invention is particularly applicable include hydrocarbons containing one or more olefinic and/or acetylenic linkages. The invention is particularly applicable to the reaction of a mercaptan with partially unsaturated hydrocarbons having unsaturated linkages of aliphatic character, preferably terminal unsaturation, and especially with halogenated unsaturated hydrocarbons in which the terminal carbon atom is unsaturated and carries a greater number of hydrogen atoms than the adjoining unsaturated carbon atom. When unsaturates are reacted with the mercaptan according to the process of this invention, the reaction product predominates in or consists of halogenated primary thioethers.

The ethylenically unsaturated organic compounds which may be reacted with mercaptans or halogenated mercaptans according to this invention include those with one or more ethylenic linkages although those generally applicable have a total of from 2 to 20 carbon atoms per molecule and 1 to 3 ethylenic linkages. Such unsaturated compounds include acyclic and cyclic olefins, and the like. Representative unsaturated compounds useful in the practice of this invention include ethylene, propylene, butene-1, butene-2, isobutene, pentene-1, pentene-2, hexene-1, heptene-1, octene-1, decene-1, dodecene-1, pentadecene-1, heptadecene-1, eicosene-1, isopentene-1, 4-methyl-1-pentene, 3,6-dimethyl-1-heptene, 7-methyl-4-nonene, 4-methyl-5-butyl-4-decene, 1,4-diphenyl-2-butene, 3-cyclohexyl-6-eicosene, 4,4-dimethyl-1-pentene, 4-methyl-2-pentene, 2,4,4-trimethyl-2-pentene, cyclopentene, 2-ethylcyclopentene, 2,5-diethylcyclopentene, cyclohexene, 3-ethylcyclohexene, 2-ethyl-4-methyl-5-heptyl-6-butyl-cyclohexene, cycloheptene, cyclooctene, 4-vinylcyclohexene, 3-ethyl-5-vinylcyclohexane, 4-(1-cyclohexenyl)-butene-1, 4-vinylcyclopentene, 1-methyl-2-dodecyl-4-vinyl-cyclopentene, 1,5,9-cyclododecatriene, and the like.

In addition to the above-named unsaturated hydrocarbons, the process of the invention is employable to effect an increased rate of reaction of a mercaptan with ethylenically unsaturated compounds containing non-hydrocarbon groups. For example, the above-named ethylenically unsaturated hydrocarbons can be substituted by halogens, particularly chlorine and bromine. Some specific examples of compounds of this type are vinyl chloride, vinyl bromide, allyl chloride, allyl bromide, dodecenyl chloride, 2-chloroeicosene-2, and the like.

Any sufficiently stable mercaptan, including a halogenated mercaptan, is suitable as a rectant to be employed in the photochemical addition thereof to the defined class of unsaturated organic compounds where at least one of the reactants is a halogenated compound. A suitable mercaptan may contain one or more sulfhydryl groups or radicals and be of alkyl, aralkyl alkenyl, aralkenyl, or aryl character and comprise the mercapto radical joined to an aliphatic or aromatic carbon atom. In the majority of cases, it is preferable to employ the normal or isoalkyl chain mercaptans of primary, secondary, or tertiary character, particularly those contained in or derived from petroleum and petroleum products. The methyl, ethyl, butyl, amyl, hexyl, heptyl, octyl, and similar mercaptans as well as their homologs and halogenated substituted products are employable with excellent results.

Another group of mercaptans which are employable as one of the two reactants comprises or includes the dimercaptans and particularly the polymethylene dimercaptans of the general formula $HS(CH_2)_nSH$. This group of mercaptans may be reacted with, for example, halogenated aliphatic hydrocarbons containing a plurality of unsaturated linkages, to produce halogenated thioethers having a high molecular weight. A particularly suitable group of halogenated unsaturated organic compounds which may be employed with these dimercaptans includes the halogenated unsaturated compounds containing unsaturated linkages of aliphatic character in alpha and omega positions (that is in terminal positions). Due to the abnormal addition reaction, the resulting products predominate in or consist of halogenated mercaptothioethers and thioethers and halogenated polythioethers. For example, 2-chlorobutadiene-1,3 may be thus reacted with normal tetramethylene dimercaptan to produce normal halogenated polyalkenyl thiols having the general formula R—S—R'—SR wherein R' is a monochlorinated normal tetramethylene radical and each R represents a mercapto and/or thioether derivative of reactants. Instead of employing straight chain, particularly halogenated unsaturated, hydrocarbons, it is also possible to use branched chain halogenated compounds provided they contain one or more unsaturated linkages of aliphatic character. The polyunsaturated halogenated organic compounds may or may not be unsaturated in terminal positions.

Typical and representative of the various thioethers which can be produced according to this invention include diethyl thioether, dipropyl thioether, dicyclohexyl thioether, dibutyl thioether, dipentadecyl thioether, 6-chlorohexyl ethyl sulfide, 8-chlorooctyl butyl sulfide, 4-chloropentyl - 3 - chloropropylsulfide, 9-chlorodecyl-5-chloropentyl sulfide, and the like.

The azo catalysts employed in the process of this invention have an acyclic azo group, —N=N—, bonded to different non-aromatic, i.e., aliphatic or cycloaliphatic carbons, at least one of which is tertiary, i.e., attached to three other carbons by single valences, with the tertiary carbon attached through carbon to a negative radical in which the three remaining valences of the latter carbon are satisfied by at least one element of atomic number 7 to 8. The negative radicals are preferably neutral with respect to acidity and include the nitrile, carbonamide and carbalkoxy groups. In general, the carbalkoxy groups have alkyl radicals of 1 to 6 carbons.

Examples of azo catalysts which may be used in the process of this invention which have one tertiary carbon are the azo compounds which may be prepared by the process described by Thiele and Stange, Ann. 283, 33–37 (1894), and include alpha(carbamylazo)isobutyronitrile,
alpha(carbamylazo)-alpha-methyleneanthonitrile,
alpha(carbamylazo)-alpha-phenylpropionitrile,
alpha(carbamylazo)-alpha-cyclopropylpropionitrile,
alpha(carbamylazo)-alpha,alpha-dicyclohexylacetonitrile,
alpha(carbamylazo)isobutyramide,
alpha(carbamylazo)-alpha,gamma-dimethylvaleramide, and
hexyl alpha(carbamylazo)-alpha,gamma-dimethylvalerate.

Azo catalysts which are symmetrical and accordingly have two tertiary groups attached to the azo nitrogens, i.e., have a tertiary carbon attached to each azo nitrogen are preferred since they are usually active 10–20° C. lower than those having only one tertiary group, i.e., one tertiary carbon attached to an azo nitrogen. Examples of these preferred compounds include alpha,alpha'-azodiisobutyronitrile,
alpha,alpha'-azobis-(alpha,gamma-dimethylvaleronitrile),
alpha,alpha'-azobis(alpha-methyleneanthonitrile),
alpha,alpha'-azobis(alpha-ethylbutyronitrile),
alpha,alpha'-azobis(alpha-phenylpropionitrile),
alpha,alpha'-azobis(alpha-cyclopropylpropionitrile),
alpha,alpha'-azobis(alpha-cyclohexylpropionitrile),
alpha,alpha'-azobis(alpha-cycloheptylpropionitrile),
alpha,alpha'-azobis(alpha-isopropyl-beta-methylbutyronitrile),
alpha,alpha'-azobis(alpha-gamma-dimethylcapronitrile),
alpha,alpha'-azobis(alpha-n-butylcapronitrile),
alpha,alpha'-azobis(alpha-isobutyl-gamma-methylvaleronitrile),
alpha,alpha'-azobis(alpha-methyl-gamma-carboxybutyronitrile), and the corresponding salts such as the sodium salt of the carboxy group, 1,1'-azodicyclohexanecarbonitrile,
1,1'-azodicycloheptanecarbonitrile,
1,1'-azobis-(3-methylcyclopentanecarbonitrile),
1,1'-azobis(2,4-dimethylcyclohexanecarbonitrile), the polymeric azonitrile derived from 2,15-cetanedione and the azonitrile derived from camphor (1,1'-azodicamphanecarbonitrile) by the method subsequently described, and the corresponding amides and esters of the above in which the nitrile group or groups are replaced by amide and/or ester groups, e.g., to give alpha-alpha'-azodiisobutyramide, alpha,alpha' - azobis(alpha,gamma-dimethylvaleramide), alpha,alpha' - azobis(alpha-cyclopropylpropionamide), 1,1' - azodicyclohexanecarbonamide, N,N' - diethyl - alpha-alpha'-azodiisobutyramide, dimethyl, diethyl and dihexyl alpha,alpha'-azodiisobutyrate, etc. Preferably, lower alkyl esters, e.g., of the 1-6 carbon alcohols are used as promoters in view of the ease and economy in preparing such esters.

The azonitriles may be prepared by the process described by Thiele and Heuser, Ann. 290, 1–43 (1896), Hartmann, Rec. trav. chim. 46, 150–153 (1927), Dox, J. Am. Chem. Soc. 47, 1471–1477 (1925). A convenient method consists in the reaction of hydrazine with a ketone to form an azine which is reacted with excess hydrogen cyanide in a system of low water content to give the azonitrile. The azonitrile can be converted to amides or esters by formation of the iminoether hydrochloride by reaction with hydrogen chloride and an alcohol followed by reaction with ammonia or hydrogen-bearing amine or with water.

Generally the more useful azo catalysts have aliphatic and/or cycloaliphatic radicals of 4–11 carbons on each of the azo nitrogens and usually have carbon and hydrogen or carbon, hydrogen and oxygen as the elements in the radical excepting the negative substituent on the tertiary carbon. Preferably, the catalysts are symmetrical azobisnitriles having hydrocarbon radicals as the only other substituents. The azobis(cyanoalkanes) of 4–11 carbons are particularly preferred.

The reaction between the ethylenically unsaturated organic compounds and the mercaptan is carried out in a manner like that of the prior art and may be effected in a batch intermittent or continuous manner. The reaction temperature is at ambient levels, that is, at the temperature of the surrounding atmosphere and is generally within the range of 32 to 100° F., preferably 50 to 100° F. The pressure is substantially atmospheric pressure although a slight pressure may be employed such as 2 to 3 pounds per square inch. A major advantage of the invention is that the azo compounds permit the reaction to occur at ambient temperatures and pressure without the necessity for expensive pressurized equipment.

Generally speaking, the reaction times also vary depending upon the temperatures, the azo compound employed, the reactants, and the amount of the additive, and can be carried out, for example, within the range between about 1 hour and about 15 days. The use of ultra-violet light instead of sunlight decreases the reaction time from a matter of days to a matter of hours. The amount of azo compound employed is within the range of about 0.1 to about 5 weight percent of the total amount of reactants.

The type of material through which the light rays are transmitted to the reactants is also influential. For instance, it is generally preferred to use quartz which permits the passage of light rays over a broad spectrum. However, it has also been found that soft glass, Pyrex and Vycor, are also operable although the reaction rates are decreased. In general, the light must be sufficient to cause generation of free radicals from the azo compounds. Preferably, the reactants are exposed to light rays in the ultraviolet range, preferably of less than 400 Angstrom units.

After the reaction is completed, the products of reaction can be recovered by well known means. For example, gases can be recovered or released to the atmosphere and a liquid product fractionated, distilled, crystallized or subjected to various other separation and recovery procedures to obtain the desired products.

The ratio of the mercaptans to the unsaturated hydrocarbon organic compound is variable over a wide range and is well known to those skilled in the art. Generally, for most applications, approximately equal molar quantities of either reactant would be used.

The following example further illustrates the objects and advantages of the invention but it should be understood that the various ingredients or reactants, amounts, temperatures, pressures, and other conditions recited in the example, should not be construed so as to unduly limit the invention.

*Specific example*

A series of runs was made in which the addition of allyl chloride to n-octyl mercaptan to produce 3-chloropropyl n-octyl sulfide was promoted by the addition of small amounts of azo-bis(isobutyronitrile). The synthesis was carried out in 10 gallon transparent glass bottles in direct sunlight (Table I) and by ultra-violet light (furnished by a 100-watt mercury vapor bulb) Table II. The feedstock for the runs was a 1 molar mixture of allyl chloride and n-octyl mercaptan.

TABLE I.—REACTION PROMOTED BY SUNLIGHT

| Azobis (Isobutyronitrile) weight percent Reaction Time, hours | None Conversion, weight percent | 0.83 Conversion, weight percent |
|---|---|---|
| 0.5 | 57 | 79.5 |
| 1.0 | 61.6 | 86.0 |
| 2.0 | 74.0 | |
| 4.0 | | 91.2 |
| 5.0 | 86.3 | 92.8 |
| 7.5 | 89.1 | |

TABLE II.—REACTION PROMOTED BY ULTRAVIOLET LIGHT [1]

| Azobis (Isobutyronitrile) weight percent Reaction Time, hours | None Conversion, weight percent | 0.83 Conversion, weight percent |
|---|---|---|
| 0.5 | 25.0 | 63.0 |
| 1.0 | 43.8 | 79.0 |
| 2.0 | 63.2 | 88.6 |
| 4.0 | 72.6 | 92.5 |

[1] 100-watt mercury vapor bulb.

In sunlight (see Table I), the same conversion was obtained in 1.0 day exposure with 0.42 weight percent azobis (isobutyronitrile) as was obtained in 5.0 days exposure without the activator.

In ultraviolet light (see Table II), the same conversion was obtained in 0.5 hour exposure with 0.83 weight percent azobis (isobutyronitrile) as was obtained in 2.0 hours exposure without the activator.

It is readily seen in the two tables that azobis (isobutyronitrile) was quite effective as a reaction activator or promoter in sunlight and in ultraviolet light.

While certain examples, structures, compositions and process steps have been described for purposes of illustration, the invention is not limited to these. Variation and modification within the scope of the disclosure and the claims can readily be effected by those skilled in the art.

I claim:

1. A process for producing halogenated thioethers comprising contacting an organic compound containing at least one unsaturated linkage between carbon atoms of aliphatic character with a mercaptan in a reaction zone in the presence of an azo compound which has an acyclic azo, —N=N—, group bonded to discrete non-aromatic carbons, at least one of which is tertiary and has attached, through carbon, a negative radical which has the remaining valences of said carbon satisfied only by elements of the class consisting of oxygen and nitrogen, at least one of said reactants being a halogenated compound, and subjecting the reactants to the influence of light rays.

2. A process for producing halogenated thioethers comprising contacting a halogenated organic compound containing at least one unsaturated linkage between carbon atoms of aliphatic character with a mercaptan in a reaction zone in the presence of an azo compound which has an acyclic azo, —N=N—, group bonded to discrete non-aromatic carbons, at least one of which is tertiary and has attached, through carbon, a negative radical which has the remaining valences of said carbon satisfied only by elements of the class consisting of oxygen and nitrogen, and subjecting the reactants to the influence of light rays.

3. A process for producing halogenated thioethers comprising contacting an organic compound containing at least one unsaturated linkage between carbon atoms of aliphatic character with a halogenated mercaptan in a reaction zone in the presence of an azo compound, which has an acyclic azo, —N=N—, group bonded to discrete non-aromatic carbons, at least one of which is tertiary and has attached, through carbon, a negative radical which has the remaining valences of said carbon satisfied only by elements of the class consisting of oxygen and nitrogen, and subjecting the reactants to the influence of light rays at ambient temperatures and pressures.

4. A process for producing halogenated thioethers comprising contacting a compound selected from the class consisting of unsaturated organic compounds and partially halogenated derivatives thereof, which compounds contain at least one unsaturated linkage between carbon atoms of aliphatic character, with a compound selected from the class consisting of mercaptans and halogenated mercaptans, at least one of said reactants being a halogenated compound, in the presence of an azo compound which has an acyclic azo, —N=N—, group bonded to discrete non-aromatic carbons, at least one of which is tertiary and which has attached through carbon, a negative radical which has the remaining valences of said carbon satisfied only by elements of the class consisting of oxygen and nitrogen, and subjecting the reactants to the influence of light rays having wave lengths sufficient to generate free radicals from said azo compound at ambient temperatures and pressures.

5. The process of claim 4 wherein said azo compound is present in an amount in the range between about 0.1 and about 5 weight percent.

6. The process of claim 4 wherein said light rays are from sunlight.

7. The process of claim 4 wherein said temperature is in the range of 32 to 100° F. and the pressure is substantially atmospheric.

8. A process for producing 3-chloropropyl n-octyl sulfide comprising contacting allyl chloride with n-octyl mercaptan in a reaction zone at substantially ambient temperature and pressure conditions in the presence of azobis(isobutyronitrile) in an amount in the range between about 0.2 and about 1 weight percent and subjecting the reactants to the influence of light rays having wave lengths below about 400 Angstrom units.

9. The process of claim 8 wherein said light rays are sunlight.

References Cited by the Examiner

UNITED STATES PATENTS 3,223,738  12/1965  Crain et al. _____ 260—609

JOHN H. MACK, *Primary Examiner.*

H. S. WILLIAMS, *Assistant Examiner.*